Jan. 2, 1945.  J. R. LINDSAY  2,366,415
ELECTRIC CONTROL SYSTEM
Filed Oct. 22, 1942  3 Sheets-Sheet 1

INVENTOR:
JAMES ROBERT LINDSAY,
By Chas. M. Nissen,
ATT'Y.

Patented Jan. 2, 1945

2,366,415

UNITED STATES PATENT OFFICE 2,366,415

ELECTRIC CONTROL SYSTEM

James Robert Lindsay, Bexley, Ohio, assignor to The Jeffrey Manufacturing Company, a corporation of Ohio Application October 22, 1942, Serial No. 462,941

16 Claims. (Cl. 172—240)

This invention relates to an electrical control system and particularly such a system for controlling the feed rate of a vibratory electromagnetic feeder or for controlling the amplitude of vibration of a vibratory electro-magnetic motor.

An object of the invention is to provide an improved and simplified control system of the above mentioned type and more specifically such a system which is adapted to control a vibratory feeder, or vibratory motor, so as to maintain a substantially constant condition as determined by a condition indicating device.

A further object of the invention is to provide an improved timer circuit either alone or in conjunction with a control circuit of the type above mentioned.

A further object of the invention is to provide an improved control circuit for an electro-magnetic feeder or motor having a power circuit in which a transformer is employed to isolate a control circuit from the power circuit.

Other objects of the invention will appear hereinafter, the novel features and combinations being set forth in the appended claims.

In the accompanying drawings.

The control system in its various forms may be employed in a wide variety of instances, one illustration of which is that it may be employed as a control system for the constant capacity feeder disclosed in the patent to Earle V. Francis, No. 2,276,383, dated March 17, 1942, as a substitute for the control system therein disclosed.

Figure 1:
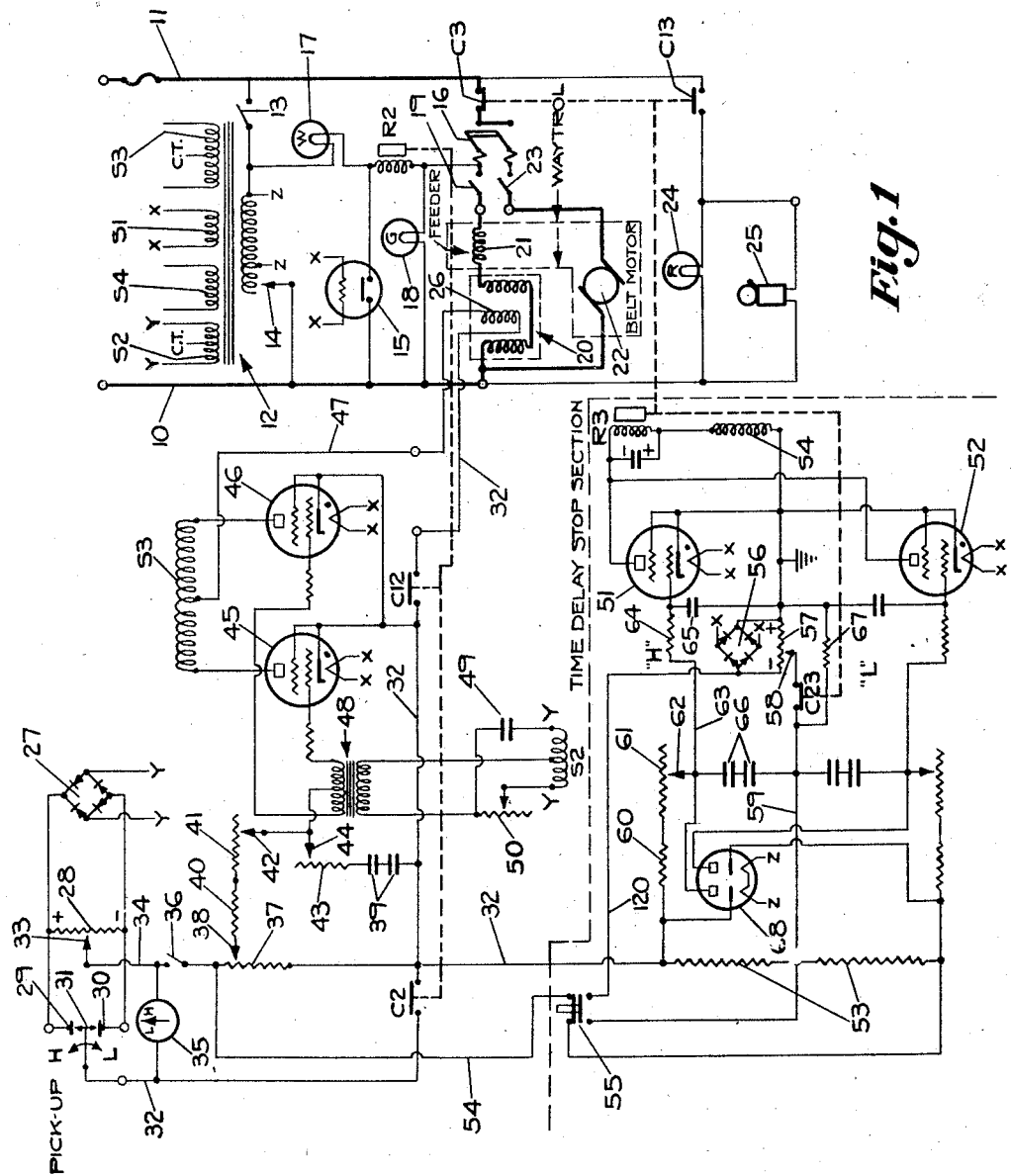
Fig. 1 is a wiring diagram of one form of my invention.

Referring particularly to Fig. 1 of the drawings it will be noted that I have provided a power circuit including power mains 10 and 11 which are energized from any desired source of alternating current, for example, commercial alternating current of 60 cycle frequency and a voltage such as 110 volts. Connected between the power mains 10 and 11 is a transformer 12 having a primary winding which is energized from said mains or conductors 10 and 11 when a switch 13 is closed, said primary winding having a variable tap 14. The transformer 12 is provided with four secondaries which are indicated as $S^1$, $S^2$, $S^3$ and $S^4$. In the interest of simplicity these secondaries are twice illustrated in the drawings, except $S^1$, once adjacent the core of the transformer 12 where they are illustrated as disconnected and again where they are illustrated with their connections to the rest of the system. Their various positions will be evident from the following description of the system.

It may be stated that $S^1$ is employed to provide the filament current for a plurality of thermionic vacuum tubes as is illustrated by the X—X design on its terminals and similar designs on the filament terminals of several of said tubes.

When the switch 13 is closed, the transformer 12 will be energized and the heater of a time delay relay 15 will be energized by virtue of the connection of said heater to said transformer secondary $S^1$. After a short time the normally open contacts of time delay relay 15 will be closed to energize a relay $R^2$ which has two contacts $C^2$ and $C^{12}$ which are closed when said relay $R^2$ is energized. The circuit for relay $R^2$ is obvious and extends from conductor or main 10 through the contacts of time delay relay 15 and coil of relay $R^2$ and through one side of a manual switch 16 and normally closed contacts $C^3$, which are controlled by relay $R^3$ hereinafter described more completely, thence to conductor 11.

When the aforesaid described circuit is closed and relay $R^2$ operated, a white signal lamp 17 is energized over an obvious circuit to indicate that time relay 15 is closed. A green signal lamp 18 is provided to indicate the closed condition of switch 16 and normally closed contacts $C^3$. When the switch 16 is closed and a disconnect switch 19 is also closed, a power circuit is provided from power main 10 through two coils of a saturable reactor 20 and through a field coil of an electro-magnetic feeder or motor 21. This feeder or motor 21 preferably takes the form of the electro-magnetic feeder illustrated at 81 in the above mentioned patent to Earle V. Francis and may be considered as part of a "Waytrol" which is so designated in Fig. 1 of the drawings and which includes the constant capacity feeding mechanism disclosed in said Francis patent. This "Waytrol" or constant capacity feeding mechanism also includes a synchronous belt driving motor 22 which is supplied with alternating current from the mains 10 and 11 over an obvious circuit and including manual switch 16, contacts $C^3$ and a disconnect switch 23. Also connected between the conductors 10 and 11 is an alarm circuit including, for example, a red signal light 24 and a bell 25, this signal circuit being controlled by normally open contacts $C^{13}$ of relay $R^3$, it being evident that contacts $C^{13}$ are closed only when contacts $C^3$ are open and vice versa.

To control the amplitude of vibration of the vibratory motor or feeder 21 I provide a control circuit or network which I shall hereinafter describe. It may be stated, however, that this control is effected in the circuit illustrated in Fig. 1 by controlling the amount of current flowing in a third winding 26 provided in the saturable reactor 20. In other words, the reactor 20 has a magnetic core with a central leg to which winding 26 is wound and by varying the current flow in said winding 26 the reactance of said reactor may be adjusted to control the amplitude of vibration and thus the feed rate of the vibratory electro-magnetic feeder 21. In addition it may be pointed out at this time that the relay $R^3$ when operated shuts down the entire system, stops both the feeder 21 and the belt motor 22 and this shut down operates automatically in response to a sustained abnormal condition as hereinafter described.

Referring now particularly to the control system which controls the current flow of winding 26 of reactor 20, I provide a full wave rectifier 27 which is energized from the outer terminals of the secondary $S^2$ and which provides a D. C. voltage across a potentiometer 28. One terminal of the potentiometer 28 is connected to a stationary "high" or "heavy" contact 29 and the other terminal is connected to a stationary "low" or "light" contact 30 of a pick-up which is in the form of a switch having a movable double contact 31 adapted to assume either a normal non-contacting position as illustrated in the drawings or an abnormal condition either of the "high" or "heavy," or "low" or "light" variety. The contact 31 of the pick-up, for example, may be controlled by spring lever 131 disclosed in the above mentioned Francis patent. In fact, I have employed mercury switches such as switches 126, 127 of the Francis patent in place of the illustrated switches provided by cooperating contacts 29 and 31 and cooperating contacts 30 and 31 and thus it is to be understood that these mercury switches or any equivalent switch means may be employed in place of that illustrated.

Connected to the movable contact 31 is a conductor 32 and connected to a variable tap 33 associated with the potentiometer 28 is a conductor 34. The variable tap 33 is provided to the end that the increment of adjustment of the feeder 21, which is effective immediately in response to closing of contacts 29 and 31, may be greater or less than the increment of adjustment when contacts 30 and 31 are closed. Connected across conductors 32 and 34 is a voltmeter 35 which may be marked "L" for "low" and "H" for "high" on opposite sides of its neutral point and which serves as an indicator to indicate the position of the pick-up. For example, when the pick-up is in its neutral position voltmeter 35 will be in its zero or central position. When "high" contacts 29 and 31 are in contact, voltmeter 35 will register "high" or "H" and conversely when "low" contacts 30 and 31 are in contact, voltmeter 35 will register "low" or "L." In short, voltmeter 35 is a visual indication of the pick-up which may be remote therefrom.

Connected between the conductors 32 and 34 under the control of contacts $C^2$ and switch 36 is a potentiometer 37. When the system is in operation switch 36 will be closed as will contacts $C^2$ of relay $R^2$ as above described. It may be stated that relay $R^2$ is provided under the control of time relay 15 to the end that the filaments of all of the electronic tubes will have time to heat up after the closing of switch 13 before relay $R^2$ operates, thus giving the tubes time to become heated before the automatic control system is thrown into operation.

Associated with potentiometer 37 is a variable tap 38 which provides for the application of a variable voltage to charge a controlling condenser 39 through resistor 40, variable resistor 41 by way of variable tap 42 and variable resistor 43 by way of variable tap 44. The tap 38 acts as a sensitivity control since it provides for a variable amount of the voltage drop across potentiometer 37 to be applied to charge the condenser 39. The variable tap 42 associated with resistor 41 provides a control of the speed of the build up of a charge on said condenser 39 once starting thereof is initiated by the appearance of a voltage on potentiometer 37. The function of the variable tap 44 is to provide for variation in the vibration of the feeder 21 the instant pick-up device moves either to a high or low position as will be explained more completely hereinafter.

The voltage across the condenser 39 and resistor 43 of the tap 44 is employed to control the current flow in the plate circuits of a pair of electronic tubes 45 and 46, preferably of the gaseous type, which have their plate or output circuits connected with transformer $S^3$ to provide a full wave rectifier, said plate circuits including the previously mentioned winding 26 of the reactor 20. The plate circuits for the tubes 45 and 46 may be briefly traced as follows: From plate of tube 45 to one terminal of secondary $S^3$, thence to the center tap thereof and by way of conductor 47 through the winding 26, thence by way of conductor 32 through contact $C^{12}$, which is closed during operating conditions by relay $R^2$, thence by a branch conductor to the cathode of tube 45 which is indirectly heated as illustrated The plate circuit of the tube 46 is the same except that the plate is connected to the other terminal of transformer $S^3$ and the cathode is connected to another branch from the conductor 32. Tubes 45 and 46 are illustrated as provided with double grids, one grid of which being a stabilizing grid connected to the cathode. Obviously other types of controllable electronic tubes may be employed. The input or grid circuits of the tubes 45 and 46 are believed obvious and that of tube 45 may be traced as follows:

From the control grid through a protecting resistor to one terminal of the secondary of transformer 48 which is the source of alternating voltage preferably out of phase and of the same frequency as the plate voltage provided by secondary $S^3$ of tubes 45 and 46. The grid circuit of tube 45 extends through half the secondary of transformer 48 by way of the center tap and a conductor leading to tap 44, thence through resistor 43 and condenser 39 to conductor 32 which, as above described, is connected to the cathode of tube 45. A similar circuit involves the other half of the secondary of transformer 48 in series with the condenser 39 and resistor 43 providing the grid or input control circuit of the tube 46.

The voltage provided for the secondary of transformer 48 is out of phase with the tubes 45 and 46 as above mentioned and this is provided by split secondary $S^2$ which has associated therewith a phase shift condenser 49 and adjustable resistor 50 as clearly illustrated, the variable resistor 50 providing for variation of phase relation between said voltage on the input circuit of tubes 45 and 46 and the output circuit. This is a balanced adjustment and once it is made it is normally maintained in its adjusted position during the operation of the system, the pick-up device being the one which provides the automatic control. This adjustment of phase relation determines the normal current flow in the output circuits of tubes 45 and 46. Preferably this normal current flow is below, rather than above, the average current flow necessary for tubes 45 and 46 to maintain the "Waytrol" in a balanced condition. It is evident that a reverse normal condition may be established if desired.

The manner in which the feeder 21 has its amplitude of vibration automatically controlled by the pick-up will now be described, under the preferred condition of phase relation above set forth.

Considering a starting condition of a "Waytrol" with no feed on the feed belt which is driven by the motor 22 and which is fed by the feeder 21, it is of course evident that the pick-up will be in the "light" position and contacts 30 and 31 will be closed. Under these conditions the voltage derived from the negative terminal of potentiometer 28 and the center tap 23 thereof will be imposed upon potentiometer 37 and a preselected amount of this voltage determined by the position of variable tap 38 will be imposed upon the circuit so that current will flow through resistors 40, 41 and 43 to charge the condenser 39. The condenser 39 under these initial conditions will be totally discharged for reasons hereinafter explained and when this voltage is initially applied current will flow to the condenser 39 progressively building up its charge. This charging current produces a voltage across resistor 43 which produces an immediate increment of increased vibration of feeder 21. As the charge on the condenser builds up, there will be a further gradual shifting of the phase relation between the input voltage of each of the tubes 45 and 46 and its plate voltage due to the increase of this direct component in the grid or input of tubes 45 and 46 which will further increase the plate current of said tubes 45 and 46, thus further reducing the reactance of reactor 20 and further increasing the amplitude of vibration of the feeder 21. After a time the feeder 21 will have fed out sufficient material so as to operate the pick-up to separate contacts 30 and 31 and in practice this is generally sufficient not only to separate contacts 30 and 31 but also to close contacts 29 and 31. When contacts 29 and 31 are thus closed, the voltage across potentiometer 37 is reversed from what it previously was and condenser 39 is discharged and charging thereof in the reverse direction begins. As contacts 30 and 31 open there will be an increment of reduced vibration of feeder 21, then as condenser 39 starts this reverse charging there will be another increment of voltage drop provided by resistor 43 which will be an amount determined by the position of tap 44. For example, if tap 44 were positioned to cut out all of the resistance of resistor 43 this increment would be zero. These two increments provide an immediate reduction in the amplitude of vibration of feeder 21 and if they are insufficient to open contacts 29 and 31 the continuing charge of condenser 39 will reduce this amplitude of vibration by progressively decreasing the D. C. current flow through winding 26 and reactor 20 at least until contacts 29 and 31 are broken. In general, the pick-up device moves from the "high" to "low" position to adjust automatically the feed rate of the feeder 21 in increments, followed by progressively increased amplitude or progressively decreased amplitude, depending upon whether the condition is a "low" condition or a "high" condition, and the charge on the condenser 39 is stabilized automatically at such a value as to maintain a substantially constant amount of material on the belt of the "Waytrol." Under certain conditions the pick-up will be in its neutral position with neither contacts 29 nor 30 in operation. Under these circumstances there is a shunt circuit provided for the condenser 39 which is obvious and which includes potentiometer 37 and resistors 40, 41 and 43 all in series in the shunt circuit. This is a very high resistance shunt circuit and with the pick-up in neutral, the condenser 39 tends to discharge very slowly, thus automatically tending to reduce the amplitude of vibration of the feeder 21 which will automatically cause the pick-up to close the "low" contacts 30 and 31, again to build up the charge on the condenser 39. If, however, the phase relation, as adjustable by resistor 50, is such that the normal current flow of tubes 45 and 46 is above the average current flow necessary for tubes 45 and 46 to maintain the "Waytrol" in balance, then the discharging of condenser 39 increases the amplitude of vibration of the feeder 21 which will, under these conditions, automatically cause the pick-up to close the "high" contacts 29 and 31, again to build up the charge on condenser 39.

In addition to the automatic control of the amplitude of vibration of the feeder 21 with the consequent maintenance of a substantially uniform condition as controlled by the pick-up, or in the specific illustration given, to maintain a substantially constant weight of material on the "Waytrol" belt, I provide an automatic time delay stop section which operates automatically to shut down the entire system, and requires manual resetting, whenever the pick-up remains in either a "high" or "low" condition for a predetermined continuous time so as to protect the system should the material being fed run out or should some other abnormal condition arise in which the pick-up was not brought back to its normal or balanced condition in a predetermined time interval.

This time delay stop section is illustrated within the dotted line at the lower left hand portion of Fig. 1 of the drawings and I shall now describe its operation.

It may be stated that the time delay stop section is essentially duplicate in character, there being provided two electric tubes 51 and 52, preferably of the gaseous type, having in their common output circuit the coil of relay $R^3$ and the secondary $S^4$, tube 51 being operative to energize relay $R^3$ in response to a sustained "high" or "heavy" condition and tube 52 being operative to energize relay $R^3$ in response to a sustained "low" or "light" condition.

Considering the condition of this circut when the pick-up is in the "high" or "heavy" position and contacts 29 and 31 are closed, it is evident that the upper terminal of the split potentiometer 53 will be positive with respect to the center tap thereof since said upper terminal is connected to conductor 32 and since conductor 34 is connected by way of conductor 54 through the normally closed contacts of push button switch 55 to the bottom terminal of potentiometer 53. Under normal conditions the grid or input circuits of tubes 51 and 52 are negatively biased, thus preventing current flow in their output circuits and therefore keeping relay $R^3$ deenergized.

The normal negative bias on the grids of tubes 51 and 52 is provided by a full wave rectifier 56 energized from secondary S¹. The positive terminal of a resistor 57 is connected to the cathode of each of the tubes 51 and 52 over obvious circuits and a variable tap 58 associated with resistor 57 extends by way of common conductor 59 through normally closed contact C²³ of relay R³ to the center tap of potentiometer 53. The grid circuit of tube 51 continues through the upper half of potentiometer 53 through high resistance 60, variable resistance 61, variable tap 62 and thence through conductor 63, through protecting resistor 64, to the control grid of tube 51.

A similar circuit is provided for the grid of tube 52 involving the lower half of potentiometer 53 which is believed obvious. It may be noted that resistor 57 is connected across D. C. terminals of the full wave rectifier 56. It may be further pointed out that a protecting condenser 65 is provided for the grid or input circuit of tube 51, there being a similar condenser for tube 52.

When the positive potential appears on the top terminal of potentiometer 53 in response to a "high" or "heavy" condition as above described, the condenser 66 connected across the upper half of potentiometer 53, through large resistor 60, variable resistor 61 and variable tap 62, will start to charge and it is to be seen that the voltage on the grid of tube 51 will be that provided by resistor 57 in accordance with the position of tap 58 plus the voltage on condenser 66 which in fact will be an opposing voltage of a variable amount, the variation of this voltage being determined by the time the condenser 66 is charged which in turn is controlled by the time the pick-up is in the "high" or "heavy" position.

As this D. C. charge builds up on this condenser 66 it will ultimately reach a value, unless the "high" or "heavy" contacts of the pick-up are previously broken, to overcome the normal negative bias of resistor 57 so that there will be a current flow in the plate circuit of tube 51 sufficient to energize relay R³, said relay R³ having a condenser connected across its coil terminals to prevent chattering thereof. Once relay R³ is energized it will lock itself in as well as shut down the power system by virtue of the contacts C²³ and C³ and in addition will give an alarm by virtue of contact C¹³.

To reset the time delay stop section by deenergizing relay R³ and returning it to its normal position it is only necessary to operate the normally open contacts of push button switch 55 as this will take the full negative voltage provided across resistor 57 and apply it to the control grid of tube 51, thus cutting off the current flow in the plate thereof. In order to provide a grid-cathode circuit while contacts C²³ are open I provide a resistor 67. The circuit for applying this resetting of the negative bias to the tube 51 extends from the cathode of said tube 51 to the terminal of resistor 57 which is marked positive, thence through resistor 67, conductor 120 and the lower contacts of switch 55, the upper half of potentiometer 53 and resistors 60 and 61, tap 62, conductor 63 and resistor 64 to the grid of tube 51. The similar circuit for tube 52 is obvious.

One feature of this stop delay time section is that the relay R³ will respond only in case the pick-up is in either the "heavy" or "high" or in the "low" or "light" position continuously for a predetermined time interval, and prevents the operation of relay R³ by accumulative successive closing of either the "high" or "low" contacts of the pick-up. To this end I provide a double full wave rectifier tube 68 which has one cathode-anode circuit for the tube 51 and the other for tube 52. Obviously two separate half wave rectifier tubes could be employed each individual to the tubes 51 and 52.

The cathode-anode circuit of tube 68 which controls tube 51 will be described, the other cathode-anode thereof similarly operating for tube 52. The left-hand cathode-anode of tube 68 provides a one way shunt circuit for resistors 60 and 61 so that whenever the upper terminal of potentiometer 53 is zero potential in response to a neutral or normal position of the pick-up or is negative in response to a "low" position thereof, there will be a short circuit for the condenser 66 including only the upper half of potentiometer 53 which has a relatively low resistance, since the upper terminal of condenser 66 is the positive terminal and thus it can discharge freely through the left hand plate and cathode of rectifier tube 68 and through the upper half of potentiometer 53. As a consequence immediately upon the opening of contacts 29 and 31 of the pick-up, condenser 66 will be quickly discharged so that successive closings of contacts 29 and 31 of the pick-up will not improperly operate the time delay stop section to energize relay R³ and shut down the system.

The overall operation of the system is believed to be evident but will be reviewed briefly, particularly after a normal condition of operation is reached. Under such normal conditions the feeder 21 will be feeding material to a balance scale having a continuous belt thereon driven by motor 22 such as a "Waytrol" disclosed in the above mentioned Francis patent. This scale will have a substantially predetermined weight on it which will vary a small amount simply to provide the automatic control. If the scale registers "high" or "heavy" the pick-up will close contacts 29 and 31 causing an increment of reduced vibration to feeder 21 which may be adjusted in amount by adjusting the tap 44 on resistor 43. Following this increment the amplitude of vibration of feeder 21 will continue to decrease so long as contacts 29 and 31 remain closed and this progressively decreasing feeding will after a short time open the contacts 29 and 31. If this alone takes place the feeder 21 will instantly increase its vibration by an increment and then continue to operate at substantially this reduced feed rate but it will gradually reduce its feed rate due to the discharge of condenser 39 through the high resistance shunt circuit including potentiometer 37, resistors 40, 41 and 43. When a "low" or "light" condition is realized, contacts 30 and 31 of the pick-up will close and immediately there is an increment of increased feeding of the feeder 21 and if these contacts stay closed following this increment the feed rate of feeder 21 will progressively increase as condenser 39 continues its charging until said "low" contacts 30 and 31 are open, after which the feeder 21 will reduce its vibration by an increment and then continue to vibrate substantially at this reduced vibration excepting that it will gradually decrease its amplitude of vibration due to the discharging of the condenser 39 through the aforementioned high resistance shunt circuit.

It is to be noted that the system is fully automatic and the charge on the condenser 39 tends to seek a normal value so as to provide the feed rate of the feeder 21 fairly close to the average overall feed rate necessary to maintain a substantially balanced condition. In case the desired feed rate of the "Waytrol" is to be changed it is not ordinarily necessary to adjust the control system at all. Normally all that is necessary is to set the counterpoise of the scale of the "Waytrol" at the desired value and the control system will automatically take control and stabilize itself in a relatively short time.

It may be further pointed out that the system of this application is a modification and simplification of that disclosed and claimed in the application of Clyde W. Baird, Serial No. 436,698, filed March 28, 1942, and entitled "Control system."

In addition to the automatic control of the system, the time delay stop section provides for automatic shutting down the system in case of some abnormal condition which produces a sustained "high" or "heavy", or "low" or "light" condition beyond a predetermined time interval.

Figure 2:
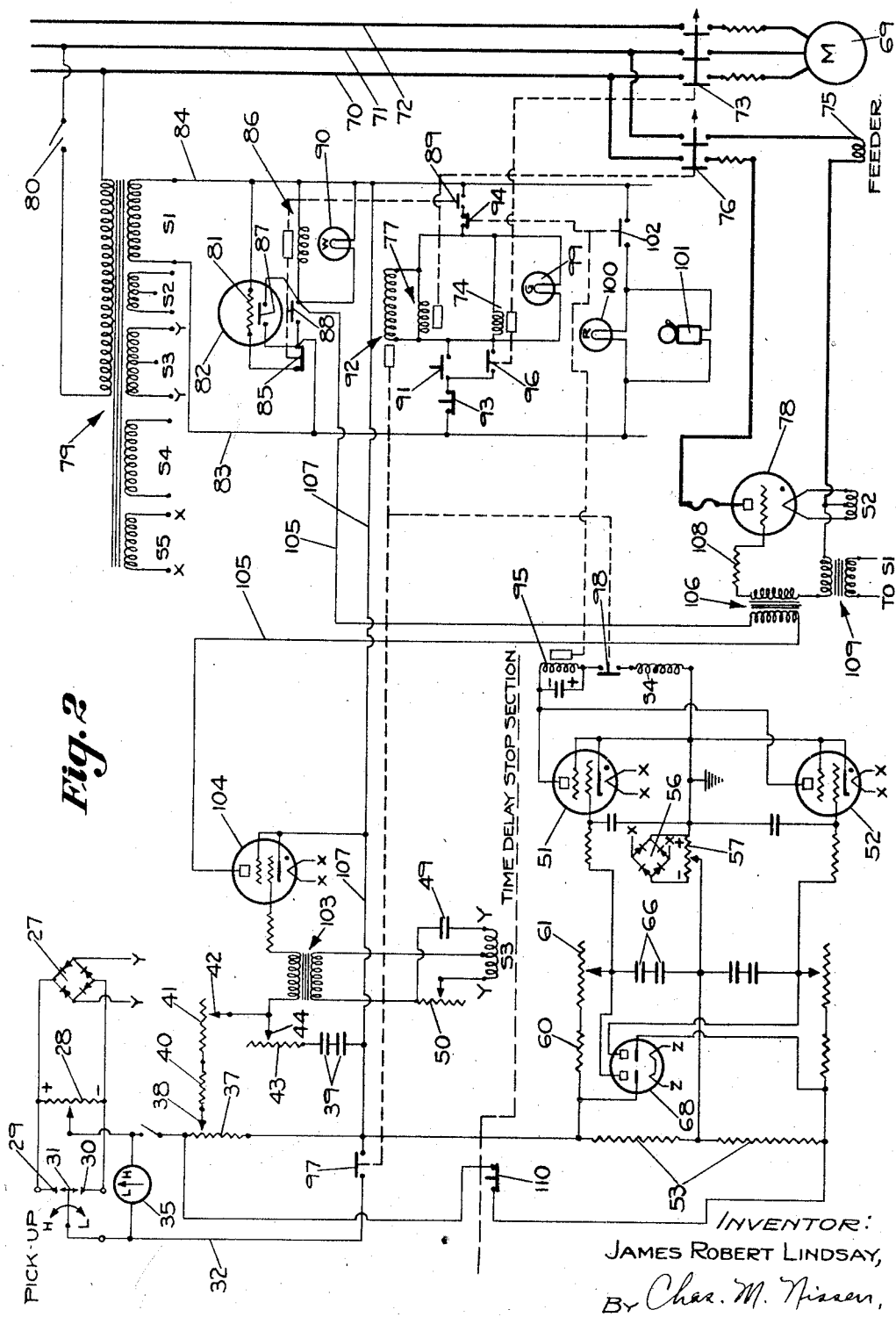
Fig. 2 is a wiring diagram of a second form of my invention.

In Fig. 2 of the drawings I have illustrated a modified form of the system as compared with that described in Fig. 1 and it is to be understood that the system of Fig. 2 follows that of Fig. 1 unless a contrary fact is clearly illustrated in the drawings or hereinafter specifically mentioned.

Referring to Fig. 2 of the drawings, the motor for the "Waytrol" is seen at 69 and is energized from a three phase source of power by means of power lines or conductors 70, 71 and 72, said motor being controlled by switch contacts 73 of relay 74. The electromagnetic feeder or motor 75 is energized from mains 70 and 71 which, for example, may have 220 volts there-across, by way of control contacts 76 controlled by relay 77, the feeder 75 having in series therewith an electric power tube 78 preferably of the gaseous discharge type and provided with a control grid whereby the power delivered to the feeder 75 and thus its amplitude of vibration may be controlled automatically as hereinafter described more completely.

The primary winding of a transformer 79 is connected across the mains 70 and 71 and controlled by a switch 80. When switch 80 is closed, transformer 79 will be energized so that power will be present on each of the secondaries thereof of which there are five, designated $S^1$, $S^2$, $S^3$, $S^4$ and $S^5$, respectively.

When $S^1$ is energized it will energize the heater 81 of the time delay relay 82 by way of an obvious circuit extending across the conductors 83 and 84 which are connected to the terminals of secondary $S^1$, said circuit for heater 81 including the normally closed contacts 85 of relay 86. After the heater 81 has been energized for a predetermined time, it closes the normally open contacts 87 thereof which energizes relay 86, closing normally open contacts 88 thereof and opening normally closed contact 85 thereof. Contacts 88 provide a holding circuit for the relay 86, holding it closed until switch 80 is open. The function of the time delay relay 82 is to delay the energization of the secondary $S^4$ and the connection of the pick-up control until the filaments of all vacuum tubes have been heated and until other devices have been placed into operation. In addition to contacts 85 and 88, relay 86 has a normally open contact 89 which is closed when it is energized. A white signal lamp 90 is also energized with relay 86, being connected in parallel therewith, thus indicating the condition of said relay 86. Upon the closing of contacts 89 the system is in condition to be placed in operation. The start push button switch 91 when closed energizes relays 92, 74 and 77 by connecting them in parallel across conductors 83 and 84 through the normally closed contacts of stop switch 93, normally closed contacts 94 of relay 95 associated with the time delay stop section and the now closed contacts 89. Relay 74 closes contact 73 to start the belt motor 69 of the "Waytrol" as previously mentioned and also closes normally open holding contacts 96 associated therewith. Relay 77 closes contacts 76 to energize the feeder 75. Relay 92 closes normally open contacts 97 associated with the automatic control system and contacts 98 of the time delay stop section, placing these two in operative condition. When relays 74, 77 and 92 are energized, the green signal lamp 99 is also energized to indicate the energized condition of said relays. Also connected across conductors 83 and 84 are red lamp signal 100 and alarm 101 which are normally deenergized but which are energized when relay 95 of the time delay stop section is energized and contact 94 is open to deenergize relays 74, 77 and 92 and stop the motor 69 and feeder 75, the circuit for said signal lamp 100 and alarm 101 being by way of normally open contacts 102 controlled by relay 95.

The automatic control circuit controlled by the pick-up follows that above described in connection with Fig. 1 except for certain differences which I shall now point out.

In place of transformer 48 of Fig. 1 with its center tap providing control for two electronic vacuum tubes I provide transformer 103 which provides an alternating voltage on the grid or input circuit of electronic vacuum tube 104. The plate or output circuit of the tube 104 extends from the plate or anode by way of conductor 105 through the primary winding of isolating transformer 106 thence to one terminal of contacts 88 which are closed during the operation of the system and connect conductor 105 to conductor 83 which leads to one terminal of secondary $S^1$ which acts as a source of plate voltage for tube 104. The cathode of tube 104 is connected by way of conductor 107 directly to conductor 84 which is connected to the other terminal of the secondary $S^1$. The input circuit of the power tube 78 is obvious and extends from the grid thereof through protecting resistor 108 to the secondary of transformer 106 and through the secondary of the transformer 109, the primary of which is connected across the terminals of secondary $S^1$ and is therefore energized therefrom. The secondary of transformer 109 is connected to the directly heated cathode or filament of tube 78. The transformer 109 is so poled with respect to the plate voltage on the tube 78 that acting alone it biases the tube to cut off. The transformer 106 produces a voltage that is shifted in phase relative to the plate voltage of the tube 78, in an amount determined by the current flow through its primary winding which is controlled by the grid voltage phase relation of tube 104, thereby to control variably and automatically the current flow through the tube 78 and the feeder 75. As a consequence the amperage of the current flow through the feeder 75 will be automatically controlled by the phase of the current flow in the primary winding of transformer 106 with respect to plate voltage of tube 78 which will be automatically controlled by the pick-up in a manner obvious from the previous description of the control circuit of Fig. 1 of the drawings.

The time delay stop section employed in Fig. 2 is the same as that employed in Fig. 1 except for differences which are obvious or which shall be hereinafter pointed out.

The time delay stop section of Fig. 2 may be cut out by means of a cut out push button switch 110 and the relay 95 is thrown out of circuit whenever relay 92 is deenergized as above set forth. The principal difference between time delay stop sections of Figs. 1 and 2 is that in Fig. 2 there is no switch which is equivalent to switch $C^{23}$ of Fig. 1 but the source of D. C. bias 56 is permanently connected to the grid circuits of the two tubes 51 and 52. The second difference is that in Fig. 2 there is a contact 98 controlled by relay 92 for which there is no equivalent switch in the time delay stop section of Fig. 1. The difference in operation is that in Fig. 2 whenever switch 90 is closed the time delay stop section immediately begins to function unless the cut out switch 110 is open. If during the starting the time delay stop section of Fig. 2 operates to energize relay 95 before a stable condition is realized, it would, of course, stop the feeder 75 and the motor 69 of the "Waytrol" and immediately open its own circuit and deenergize relay 92 and open its contacts 98. The system would start again merely by pushing the start push button switch 91. If desired, by pushing the cut out switch 110 the time delay stop section may be rendered ineffective for any desired starting time period. Since the grid bias provided by rectifier 56 and resistor 57 is always in circuit with the tubes 51 and 52, the switch 110 has a single pole switch rather than a double pole switch as is seen at 55 of Fig. 1.

To review briefly the operation of the system of Fig. 2, switch 80 is first closed to energize the transformer 79 and this starts the heating of the filaments of the various vacuum tubes and it starts heating the various rectifiers, also starting the time delay relay 82 in operation which, after a predetermined time, closes its contact 87, energizes relay 86, closing a holding circuit for the same, simultaneously opening the heater circuit of relay 82 and turning on the white signal lamp 90. The operator then pushes start button 91 energizing relays 74, 77 and 92 starting the feeder 75 and turning motor 69 of the "Waytrol" conveyor belt and through the relay 92 closing the control circuit including the pick-up by way of contacts 97 and placing the time delay stop section in operation through contacts 98. The system is then in operation. Since the condenser 39 will have been discharged because of the high resistance short circuit provided for it, the amplitude of vibration of the feeder 75 will be below "normal" and if there is not already a "low" or "light" condition registered by the pick-up such a condition will be registered shortly after starting. This will cause contacts 30 and 31 to engage and current to flow to the condenser 39 through resistors 40, 41 and 43 in series. This initial current flow will produce a voltage drop across resistor 43 causing an increment of increased amplitude of vibration of the feeder 75 by virtue of the increment of the immediate increase in current flow in the plate or output circuit of the tube 104 and if the light condition persists for awhile, as it probably will, the charge on the condenser 39 will build up and the amplitude of vibration of the feeder 75 will continue to increase until a sufficient load is on the "Waytrol" belt to break the contacts 30 and 31, whereupon the amplitude of vibration of the feeder 75 will be decreased by an increment and then maintained at this decreased amplitude of vibration except for a slow and gradual decrease because of the gradual discharge of condenser 39 through its shunt circuit through resistors 37, 40, 41 and 43. Should the previously described increase of feed rate of feeder 75 cause "high" contacts 29 and 31 to engage, there will first be a further increment of decreased vibration of feeder 75 by virtue of voltage drop across resistor 43 followed by progressive decrease of amplitude of vibration thereof until the pick-up again moves to the neutral position. It is, of course, evident that in the operation of the system of both Figs. 1 and 2 as well as the hereinafter described system of Fig. 3, the pickup will move rather frequently from the "high" to the "low" position and at times assume a neutral position, the result being that the feed rate of the feeder will supply sufficient material so that the average condition of the pick-up is one of substantial balance, variations being quite small and only such as are necessary to provide the automatic control above mentioned.

It may be pointed out that one feature of importance in the system of Fig. 2 is the isolation of the control system, including both the time delay stop section and those controls operated by the pick-up, by the transformer 106 from high voltage on the feeder 75 and motor 69. For example, the feeder may be operated from 220 or 440 volts or even higher and the voltage on the control circuit may be relatively low such as of the order of a maximum of 15 volts except for the plate voltage of the tubes 104, 51 and 52 which will, of course, be of higher voltage.

Figure 3:
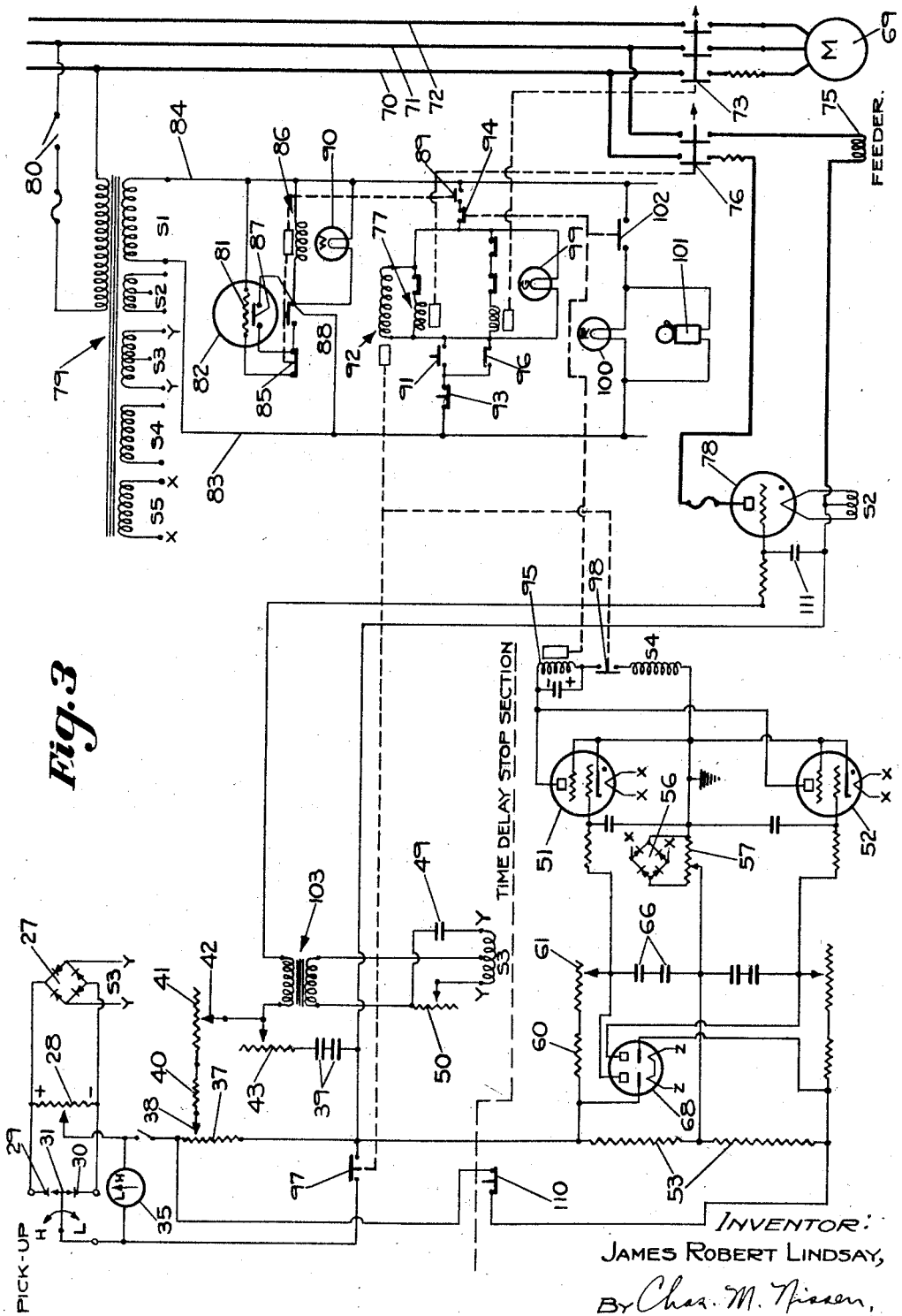
Fig. 3 is a wiring diagram of a third form of my invention.

In Fig. 3 of the drawings I have shown a modification and simplification of the system of Fig. 2 which, however, eliminates the feature of isolating the control circuit from the power circuit, and where simplification is preferred to this system of isolation, the system of Fig. 3 may be employed. The system of Fig. 3 differs from Fig. 2 only in the following respect: The transformers 106 and 109 employed in Fig. 2 and the tube 104 have been eliminated, consequently the tube 78 is controlled directly by transformer 103 and condenser 39 and associated resistors, which function in the manner above described so that the voltage on the condenser 39 and the voltage drop across resistor 43 operate to control automatically the grid shift between the grid or input circuit of the tube 78 and its plate or output circuit. I have also provided a protecting condenser 111 across the grid or input circuit of the tube 78. The operation of the system of Fig. 3 is essentially the same as that of Fig. 2 except that it lacks the feature of isolation of the power and control circuit above described.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. An electrical control circuit including an electronic relay having an input circuit network and an output circuit, said input network including a source of direct current, a condenser chargeable from said source of current and operable to control the current flow in said output circuit in accordance with the charge thereon, and switch means operable to apply reverse charging currents to said condenser from said source of direct current.

2. An electrical control circuit including an electronic relay having an input circuit network and an output circuit, said input network including a condenser having a variable resistance in series therewith, a source of direct current, and switch means for selectively charging said condenser from said source through said resistance in reverse directions and in removing said charge, said condenser also having a high resistance shunt circuit.

3. An electrical control circuit including an electronic relay having an input circuit network and an output circuit, said input network including a condenser having a resistance in series therewith, a source of direct current, and switch means for selectively charging said condenser from said source through said resistance in reverse directions and in removing said charge, said condenser also having a high resistance shunt circuit.

4. An electrical control circuit including an electronic relay having an input circuit network and an output circuit, said input network including a condenser having a resistance in series therewith, a source of direct current, and switch means for selectively charging said condenser from said source through said resistance and in removing said charge.

5. An electrical control circuit including an electronic relay having an input circuit network and an output circuit, said input network including a condenser having a variable resistance in series therewith, a source of direct current, and switch means for selectively charging said condenser from said source through said resistance and in removing said charge.

6. An electronic time relay comprising an electronic tube having an output circuit including a relay and an input control network, said input network including a condenser having resistance in series therewith, a source of voltage for charging said condenser through said resistance, a switch operable to apply said voltage to charge said condenser, said condenser when charged to a predetermined value controlling said electronic tube to operate said relay in said output circuit, an electronic relay shunting said resistance to discharge said condenser quickly whenever said condenser is disconnected from its charging voltage, and means for applying a negative bias to the input network of said tube and to disconnect said network from said source of condenser charging voltage.

7. An electronic time relay comprising an electronic tube having an output circuit including a relay and an input control network, said input network including a condenser having resistance in series therewith, a source of voltage for charging said condenser through said resistance, a switch operable to apply said voltage to charge said condenser, said condenser when charged to a predetermined value controlling said electronic tube to operate said relay in said output circuit, and an electronic relay shunting said resistance to discharge said condenser quickly whenever said condenser is disconnected from its charging voltage.

8. An electronic time relay comprising an electronic tube having an output circuit including a relay and an input control network, said input network including a condenser having resistance in series therewith, a source of voltage for charging said condenser through said resistance, and a switch operable to apply said voltage to charge said condenser, said condenser when charged to a predetermined value controlling said electronic tube to operate said relay in said output circuit.

9. A control circuit including an electronic relay having an output circuit and a controlling input network, said input network including a chargeable condenser adapted to control the current flow in the output circuit of said electronic relay in accordance with the charge thereon, a charging circuit for said condenser including a source of D. C. voltage and a variable resistance operable to control an increment of output current variation, and switch means for selectively connecting said source of voltage to said condenser through said resistance in reverse directions and in disconnecting it.

10. A control circuit including an electronic relay having an output circuit and a controlling input network, said input network including a chargeable condenser adapted to control the current flow in the output circuit of said electronic relay in accordance with the charge thereon, a charging circuit for said condenser including a source of D. C. voltage and a resistance operable to control an increment of output current variation, and switch means for selectively connecting said source of voltage to said condenser through said resistance in reverse directions and in disconnecting it.

11. A control circuit including an electronic relay having an output circuit and a controlling input network, said input network including a chargeable condenser adapted to control the current flow in the output circuit of said electronic relay in accordance with the charge thereon, a charging circuit for said condenser including a source of D. C. voltage and a resistance operable to control an increment of output current variation, and switch means for selectively connecting said source of voltage to said condenser through said resistance and in disconnecting it.

12. A control circuit including an electronic relay having an output circuit and a controlling input network, said input network including a chargeable condenser adapted to control the current flow in the output circuit of said electronic relay in accordance with the charge thereon, a charging circuit for said condenser including a source of D. C. voltage and a variable resistance operable to control an increment of output current variation, and switch means for selectively connecting said source of voltage to said condenser through said resistance and in disconnecting it.

13. An electrical system including an electromagnetic vibratory motor, a power circuit for said motor including a source of alternating current and the cathode and plate of an electronic tube, said tube having a control circuit, said control circuit including a source of alternating current of the frequency of said first named source of current, and a transformer having its secondary also connected in said control circuit and having its primary connected in the plate circuit of a second electronic tube, said transformer being a source of voltage to control the power flow in said first named tube according to the current flow in its primary winding and also operating to isolate said first named electronic tube voltages from said second named tube, and means to control the plate current of said second named tube by controlling the input voltage thereof.

14. An electrical system including an electromagnetic vibratory motor, a power circuit for said motor including a source of alternating current and the cathode and plate of an electronic tube, said tube having a control circuit, said control circuit including a source of alternating current of the frequency of said first named source of current, and a transformer having its secondary also connected in said control circuit and having its primary connected in the plate circuit of a second electronic tube, said transformer being a source of voltage to control the power flow in said first named tube according to the current flow in its primary winding and also operating to isolate said first named electronic tube voltages from said second named tube, and means to control the plate current of said second named tube.

15. An electrical system including an electromagnetic vibratory motor, a power circuit for said motor including a source of alternating current and the cathode and plate of an electronic tube, said tube having a control circuit, said control circuit including a source of alternating current of the frequency of said first named source of current, and a transformer having its secondary also connected in said control circuit and having its primary connected for energization by a variable current to control the firing period of said tube during each cycle of operation relative to said first named source of alternating current.

16. A control circuit including an electronic tube having an input network, said network including a condenser, a source of charging current for said condenser, a control switch for connecting said source of current to said condenser, said condenser having a shunt circuit including a variable resistance through which it charges and discharges.

JAMES ROBERT LINDSAY.